March 4, 1930.   P. E. MACK   1,749,189
MOTOR DRIVEN LAWN MOWER
Filed March 14, 1925   3 Sheets-Sheet 1

Inventor:
Perry E Mack

By

Attorneys

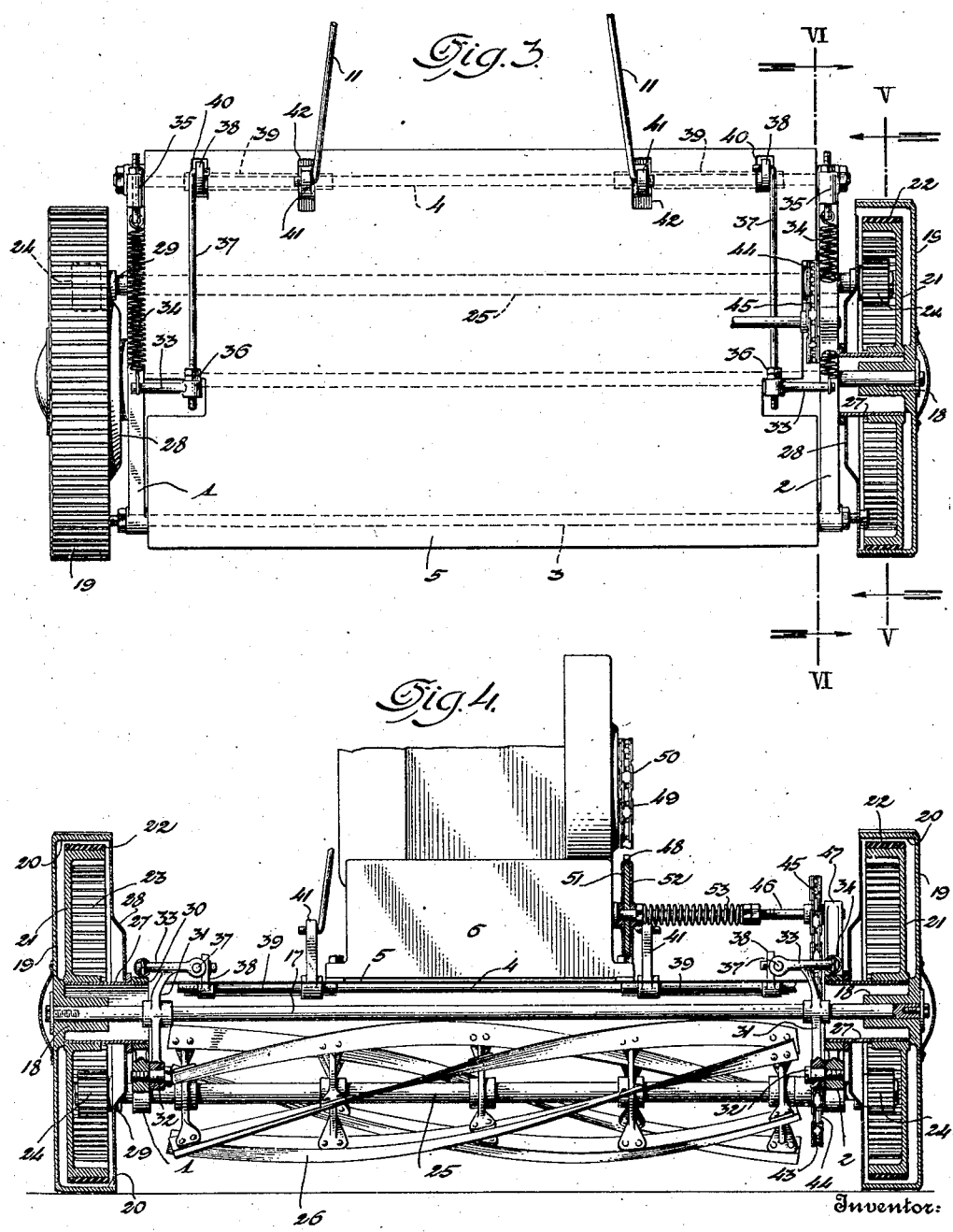

March 4, 1930.  P. E. MACK  1,749,189
MOTOR DRIVEN LAWN MOWER
Filed March 14, 1925   3 Sheets-Sheet 3

Inventor:
Perry E. Mack

By

Attorneys

Patented Mar. 4, 1930

1,749,189

UNITED STATES PATENT OFFICE

PERRY E. MACK, OF MILWAUKEE, WISCONSIN

MOTOR-DRIVEN LAWN MOWER

Application filed March 14, 1925. Serial No. 15,541.

In my patent on a motor driven lawn mower, No. 1,554,744, of September 22, 1925, there is disclosed a motor driven lawn mower adapted to be guided and controlled by an operator walking behind the lawn mower with the traction and cutting operations performed by a motor or prime mover balanced on the machine. Power is transmitted from the motor to the cutter shaft and from the cutter shaft to the ground engaging wheels, with manually controlled friction clutches axially of the ground engaging wheels for controlling the application of power thereto for moving the lawn mower. The friction clutches are of the disk type in proximity to the axles of the ground engaging wheels and set in or removed from the peripheries of the wheels, and I have found that a better and more economical driving relation can be established between ground engaging wheels and a source of power by applying the power at the rims or treads of the ground engaging wheels. I have also found that large peripheral engaging clutches establish a better driving relation and permit of easier accessibility to the parts of the ground engaging wheels when occasion requires.

This invention, in its broadest aspect, involves large peripheral clutches in the ground engaging wheels of the lawn mower to establish a driving relation between a driven cutter shaft and the ground engaging wheels with the result that there is a better driving relation, and economical construction and greater facility of assembling the parts of the ground engaging wheels.

Numerous other advantages are gained by the construction to be hereinafter specifically described and then claimed, and reference will now be had to the drawings, wherein Figure 1 is a perspective view of a motor driven lawn mower in accordance with my invention;

Fig. 3 is a plan of a portion of the lawn mower, partly in a horizontal section;

Fig. 4 is a front elevation of the same partly in vertical section;

Figure 1:
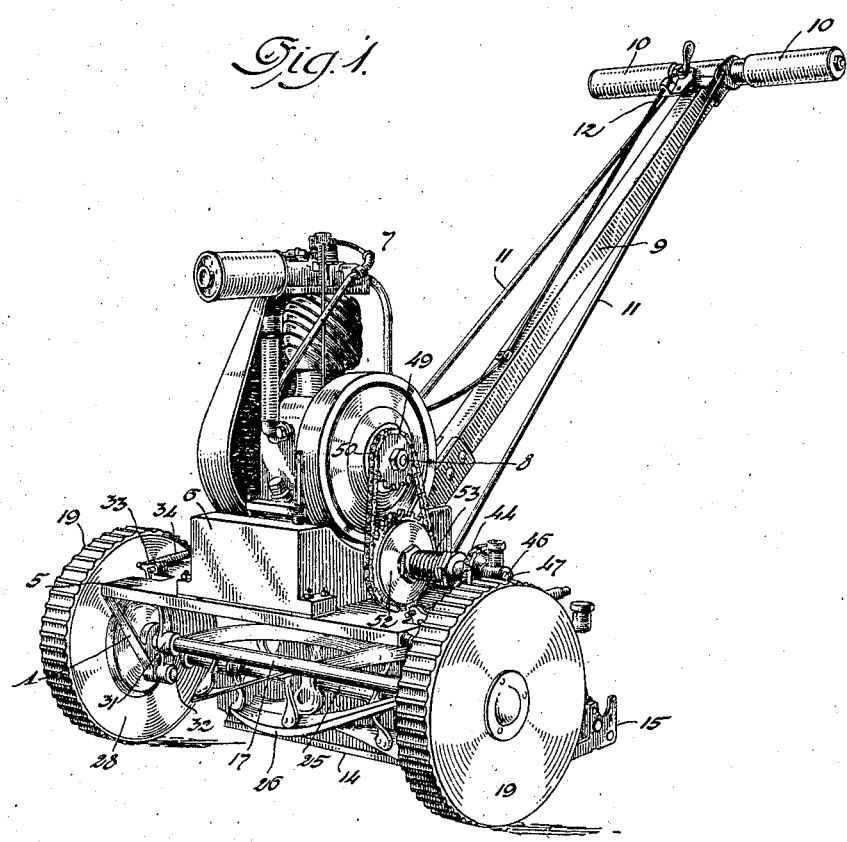
Figure 2:
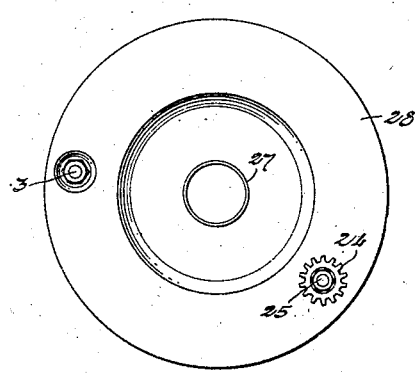
Fig. 2 is a side elevation of a closure plate for each ground engaging wheel.
Figure 5:
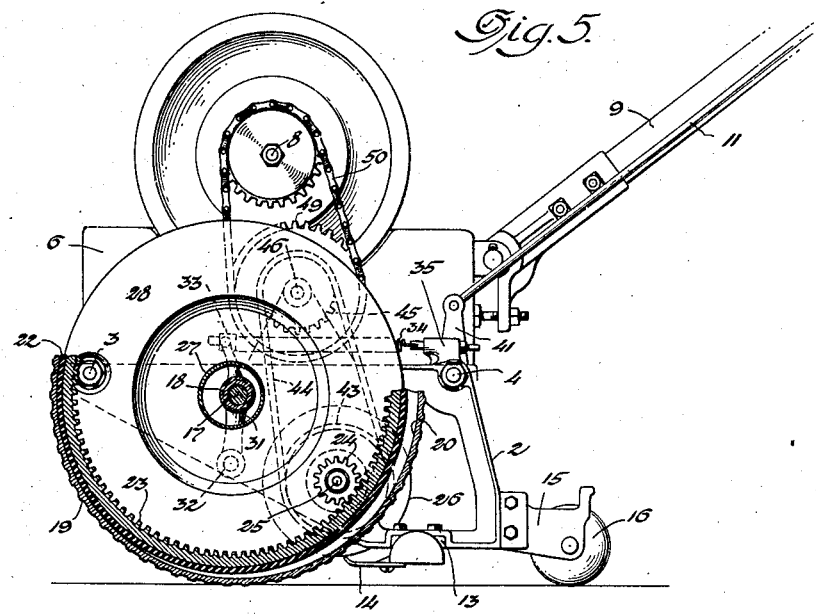
Fig. 5 is a side elevation of a portion of the lawn mower showing parts in section on the line V—V of Fig. 3.
Figure 6:
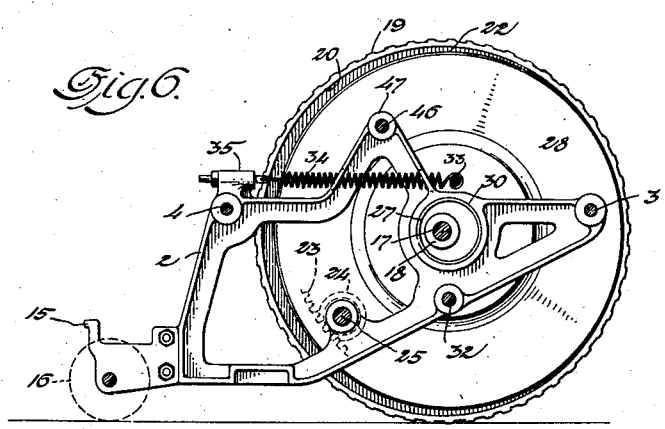
Fig. 6 is a similar view showing parts in section taken on the line VI—VI of Fig. 3.

To put my invention into practice, I provide side frames 1 and 2 and connecting these side frames are tie rods 3 and 4 on which is mounted a platform or cover 5 supporting the base 6 of a motor or power plant 7, including a crank shaft 8, a carbureter, intake and exhaust manifolds, a fuel supply tank, and such other accessories necessary to provide a rugged and easily controlled engine or motor. The side frames 1 and 2 with the platform 5 constitute a rigid structure which in some instances might be a one-piece casting.

Suitably attached to the platform 5 or the base 6 of the motor 7 is a rearwardly extending and upwardly inclined handle bar or tongue 9 having control handle portions 10 provided with reach rods 11 extending downwardly substantially parallel to the handle bar 9. On the handle bar 9 is an engine control device 12.

The frames 1 and 2 are connected by a support 13 for a stationary plate 14 and the rear edges of said frames are provided with bearings 15 for a ground engaging roller 16.

Extending through the frames 1 and 2 is an axle 17 and mounted on the ends of said wheel axle are the hub portions 18 of hollow ground engaging wheels 19 having inner annular flange walls 20. In these wheels are wheel-like clutch members 21 having the peripheries thereof provided with clutch rings 22 adapted to be engaged by the clutch walls 20 of the ground engaging wheels to establish a driving relation between the clutch members 21 and the ground engaging wheels, said clutch members corresponding to inner driven wheels approximating in size the outer ground engaging wheels 19. The clutch members 21 have the inner annular walls thereof provided with teeth fashioned to afford circular racks 23 and meshing with said racks are pinions 24 on the ends of a cutter shaft 25 journaled in the frames 1 and 2, said cutter shaft having a conventional form of spirally bladed cutter 26.

The clutch members 21 are carried by tubular hubs 27 extending into openings 30 of the side frames 1 and 2 and on said hubs are closure plates 28 further held relative to the side frames by the tie rod 3 and the cutter shaft 25 journaled in bearings 29 of said closure plates. The closure plates 28 loosely fit in the inner open sides of the ground engaging wheels 19 and are adapted to exclude dirt, dust and other elements from said ground engaging wheels, particularly the inner wheels or clutch members 21, without interfering with a radial movement of the outer wheels relative to the inner wheels, as will hereinafter appear.

Pivotally mounted on the axle 17 at the inner ends of the hubs 27 are bell cranks or rockable members 31 which have the lower ends thereof pivotally connected, as at 32, to the frames 1 and 2. The upper ends of the bell cranks 31 are provided with cross heads 33 having the outer ends thereof connected by coiled retractile springs 34 to tension regulating devices 35 mounted on the rear ends of the frames 1 and 2.

The inner ends of the cross heads 33 are adjustably connected, as at 36 to rearwardly extending rods 37 and these rods are articulated with the cranks 38 of rock sleeves 39 loose on the tie rod 4. The cranks 38 extend through slots 40 of the platform 5 and the inner ends of the rock sleeves 39 have cranks 41 extending through slots 42 of the platform. The control rods 11 of the handle bar 9 are operatively connected to the cranks 41, so that when the rods 11 are manually actuated the crank sleeves 39 and the bell cranks 31 will be rocked to shift the frame structure formed by the members 1, 2, 27, 18 and 17, thus moving the clutch members 21 relative to the ground engaging wheels, whereby the clutch members 21 and the clutch walls 20 of the ground engaging wheels are brought into contact to impart rotation thereto when the cutter shaft 25 is driven.

On one end of the cutter shaft 25 is a sprocket wheel 43 for a sprocket chain 44 extending upwardly through the cutaway edge of the platform 5 and trained over a sprocket wheel 45. This sprocket wheel is mounted on the shaft 46 journaled in a bearing 47 and the base 6 of the motor 7. On the inner end of the shaft 46 is a loose sprocket wheel 48 in a vertical plane with a sprocket wheel 49 on the crank shaft 8 of the motor and an endless sprocket chain 50 transmits power from the crank shaft 8 to the shaft 46. The last mentioned sprocket wheel 48 is normally held for rotative continuity with the shaft 46 by a fixed disk clutch member 51 and the spring pressed disk clutch member 52, the sprocket wheel being sandwiched between the disk clutch members, as best shown in Fig. 4, so as to provide a slip clutch adapted to disengage the motor relative to the cutter shaft 25 should the latter encounter any serious obstruction. The effectiveness of the sprocket wheel clutch may be governed by regulating the tension of the spring 53 on the shaft 46.

With the clutch members 21 disengaged from the ground engaging wheels 19, as shown in Fig. 4, the lawn mower may be manually pushed or pulled, but by starting the motor and placing the ground engaging wheels in engagement with the cutch members, the lawn mower may be propelled by power. Since the power is derived through the medium of the cutter shaft 25, it is obvious that the cutter will be driven during the operation of the engine.

It is to be noted that there is sufficient clearance for relative movement between the inner hubs 18 and the outer hubs 27, and that by establishing a driving relation at the peripheries of the ground engaging wheels there is a more direct application of power, consequently a light duty motor may be used where otherwise a heavy duty motor would be required to properly propel the lawn mower.

It is also to be noted that the side frames with the platform constitute a structure through which extends the axle of the ground engaging wheels and the only connection between said wheel axle and the structure are the shiftable cranks on the axle, which have their points of support below the axle, and their shifting means in a plane above the axle. It is by virtue of this method of articulation that the axle and ground engaging wheels may be easily adjusted relative to the platform with its roller engaging the ground for maintaining the platform substantially horizontal.

It is thought that the control and utility of the lawn mower will be apparent without further description, and while in the drawings there is illustrated a preferred embodiment of my invention, it is to be understood that the structural elements are susceptible to such variations and modifications as fall within the scope of the appended claims.

What I claim is:—

1. In a power lawn mower, ground wheels, a structure shiftable relatively to said ground wheels, inner wheels supported by said structure and fitted loosely within the ground wheels, said inner wheels being adapted for frictional engagement with the ground wheels, means for driving said inner wheels, a handle bar by which said ground wheels may be guided, control handle portions rotatably mounted on said handle bar, and rods connecting said portions to said structure, whereby turning of said portions causes relative movement between said inner wheels and ground wheels to control the application of power to said ground wheels.

2. In a power lawn mower, ground wheels, an axle connecting said ground wheels, a frame pivotally suspended from said axle, a shaft journalled in said frame, inner wheels fitted loosely in said ground wheels and adapted for frictional engagement therewith, said inner wheels being supported by said frame, driving means between the shaft and inner wheels, and means for moving said frame relatively to said ground wheels to control engagement between the ground wheels and inner wheels.

3. In a power lawn mower, ground wheels, an axle connecting said ground wheels, a frame pivotally suspended from said axle, a shaft journalled in said frame, inner wheels fitted loosely in said ground wheels and adapted for frictional engagement therewith, said inner wheels being supported by said frame, driving means between the shaft and inner wheels, a handle bar by which said ground wheels may be guided, and means operable at said handle bar for causing relative movement between said frame and ground wheels to control the application of power to said ground wheels.

4. In a power lawn mower, ground wheels, an axle connecting said ground wheels, rocker arms mounted on said axle, side frame secured to one end of each of said rocker arms, hubs carried by said side frames, inner wheels journalled on said hubs and received loosely in said ground wheels, said inner wheels being adapted for frictional engagement with said ground wheels, driving means carried by said side frames and geared to said inner wheels, and operating means connected to the remaining ends of said rocker arms for swinging the same, whereby to move said side frames and inner wheels relatively to said ground wheels.

In testimony whereof I affix my signature.

PERRY E. MACK.